United States Patent
Basso et al.

(10) Patent No.: US 6,658,481 B1
(45) Date of Patent: Dec. 2, 2003

(54) ROUTER USES A SINGLE HIERARCHY INDEPENDENT ROUTING TABLE THAT INCLUDES A FLAG TO LOOK-UP A SERIES OF NEXT HOP ROUTERS FOR ROUTING PACKETS

(75) Inventors: Claude Basso, Raleigh, NC (US); Anthony Matteo Gallo, Apex, NC (US); Natarajan Vaidhyanathan, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/544,312

(22) Filed: Apr. 6, 2000

(51) Int. Cl.[7] .............................................. G06F 15/173
(52) U.S. Cl. ....................... 709/243; 709/238; 709/242; 370/351
(58) Field of Search ................................ 709/238, 239, 709/242, 243, 244; 370/238, 392, 235, 254, 255, 351

(56) References Cited

U.S. PATENT DOCUMENTS

| | | | | |
|---|---|---|---|---|
| 6,112,248 A | * | 8/2000 | Maciel et al. ............... | 709/238 |
| 6,137,781 A | * | 10/2000 | Goto et al. .................. | 370/255 |
| 6,310,858 B1 | * | 10/2001 | Kano et al. .................. | 370/235 |
| 6,553,002 B1 | * | 4/2003 | Bremer et al. .............. | 370/254 |
| 6,553,031 B1 | * | 4/2003 | Nakamura et al. .......... | 370/392 |
| 6,567,380 B1 | * | 5/2003 | Chen ............................ | 370/238 |

* cited by examiner

Primary Examiner—Le Hien Luu
(74) Attorney, Agent, or Firm—Scully, Scott, Murphy & Presser

(57) ABSTRACT

In a network processor-based device, there is provided a single routing table for network routers and an efficient routing algorithm implemented by the routing device. The routing table includes packet forwarding information including a subnet address associated with a destination address location, an ISO layer three (3) network protocol address, e.g., IP address, of a router interface that can route packets to the subnet address, and an identifier indicating whether that router is an exit BGP router that may or may not be directly attached to the packet forwarding router. A table look-up mechanism is provided to determine next hop information and determine associated BGP status of the next hop. At such time it is determined that a router is not a BGP router (i.e., is directly attached to the forwarding router), the packet will be transmitted to that router.

6 Claims, 4 Drawing Sheets

| Subnet Address | Net Hop Address | Lookup Flag |
|---|---|---|
| 9.*.*.* | 6.9.1.1 | True |
| 10.*.*.* | 6.10.1.1 | True |
| 6.9.1.1 | 8.2.1.1 | False |
| 6.10.1.1 | 8.3.1.1 | False |
| | | |
| | | |
| | | |

FIG. 1
Prior Art

BGP Lookup Table of R5  10

| Destination Subnet | BGP Next hop |
|---|---|
| 9.*.*.* | 6.9.1.1 |
| 10.*.*.* | 6.10.1.1 |
| . | . |
| . | . |
| . | . |
| . | . |
| . | . |

Next Hop Lookup Table of R5  20

| Destination Subnet | Next hop |
|---|---|
| 6.9.1.1 | 8.2.1.1 |
| 6.10.1.1 | 8.3.1.1 |
| . | . |
| . | . |
| . | . |
| . | . |
| . | . |

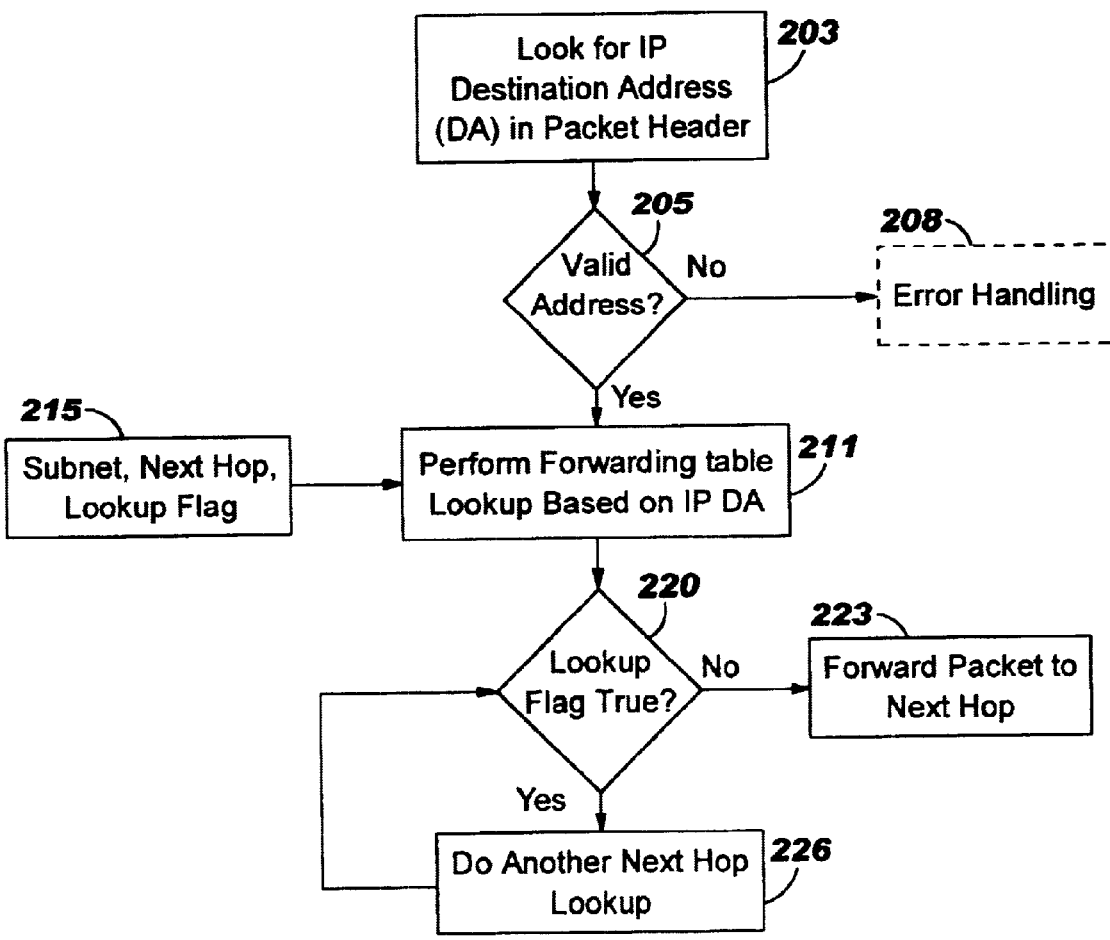

Forwarding Table

| Subnet Address | Next Hop Address | Lookup Flag |
|---|---|---|
| 9.*.*.* | I | True |
| I | H | True |
| H | G | False |

ROUTER USES A SINGLE HIERARCHY INDEPENDENT ROUTING TABLE THAT INCLUDES A FLAG TO LOOK-UP A SERIES OF NEXT HOP ROUTERS FOR ROUTING PACKETS

BACKGROUND OF THE INVENTION

1. Field of the Invention

This invention relates generally to network processor-based devices, and more specifically to a single hierarchy independent routing table and packet routing methodology.

2. Discussion of the Prior Art

Currently, network processor-based devices that perform packet routing functions maintain multiple packet routing tables. For instance, as illustrated in FIG. 1, internet routers providing normal IP forwarding and External Border Gateway Protocol Next Hop Features are typically provided with router look-up tables including: 1) an External Border Gateway Protocol table 10 for controlling flow into and out of autonomous networks; and, 2) a packet forwarding table (Next Hop Feature table) 20 for listing subnet addresses 22 and subsequent "next hop" addresses 25 for all routers connected in the autonomous network. More particularly, the BGP tables 10 are maintained on all routers and include subnet addresses 12 for other routers on external networks. The BGP router function particularly, is what is seen by outside networks and is the router that connects an autonomous network to independent external networks.

FIG. 2 identifies an example network 50 comprising an autonomous network 30 and external networks 40a,b interconnected via routers R and network links. In operation, System A (32) in the autonomous network 30 is to forward a packet to a System 1 (34) in external network 40a at an ISO layer three network protocol destination address, e.g., IP address 9.1.1.1. In the forwarding path, router R5 would perform a first lookup in its BGP Lookup table 10 (FIG. 1) to determine whether the path to System 1 (34) destination 9.1.1.1 goes through an exit router and, if so, determines the IP address of the egress interface for that exit router. In the example network of FIG. 1, this BGP egress interface is at address 6.9.1.1. Afterwards, the router performs a second lookup in the next hop table 20 with the IP address of the egress interface to determine the real next hop. In the example network of FIG. 1, this next hop address is determined as 8.2.1.1 (25). Thus, this forwarding packet operation requires two tables and two lookups. Once its status is ascertained, the packet is then transmitted to the router/end station indicated by the next hop lookup and the process is repeated until the packet is received by System 1 (34). If, for example, System 1 (at address 9.1.1.1) is moved so that it is connected to router RB instead of RC (for example, at 9.2.2.1), all router forwarding tables would then be updated to indicate RB as the next hop for System 1.

Thus, in current router operation, both tables 10, 20 are utilized when sending and receiving IP packets. BGP tables 10 are updated using the BGP protocol which enables routers to know the BGP structure of networks. Packet forwarding tables 20 are updated using the OSPF protocol, for example, which enables routers to understand the internal network architecture, i.e., within the autonomous network. OSPF calculates the shortest path from an IP Source Address (SA) to IP Destination Address (DA). For example, when a subnet is moved/deleted within a network, OSPF will update the new shortest path to that changed/deleted subnet if required (i.e., if associated next hop changes). This requires forwarding tables in all routers to be updated which entails deleting table entries and inserting new fields. The process of deleting and inserting new entries is not efficient. In addition, OSPF cannot account for local network structures when assembling routing table (i.e., OSPF is not aware of BGP routers).

It would be highly desirable to combine router forwarding and BGP tables into one table for more efficient processing and to have one router table that is hierarchy independent.

SUMMARY OF THE INVENTION

It is an object of the invention to provide a hierarchy independent routing table that comprises a combination of packet forwarding (Next hop) and BGP Lookup tables into one table for more efficient processing.

It is a further object of the invention to provide a hierarchy independent routing forwarding table implemented in network processor-based routing devices for reducing routing algorithm complexity.

According to the invention, there is provided an apparatus and method for routing packets in a network comprising one or more router devices, the method comprising the steps of: determining from a packet arrived at a router device a destination address for the packet; performing a look-up in a single packet forwarding table in the device to ascertain packet forwarding information comprising a subnet address associated with the destination address, an IP address of a router interface servicing the subnet address, and an associated flag indicating whether the router is a BGP exit router; forwarding the packet to the indicated IP address when the flag value is not set and, if said flag value is set, the steps of utilizing the indicated IP address as index to perform subsequent look-ups in the single packet forwarding table to find IP address of a next hop router and associated flag value, and forwarding the packet to the indicated next hop router upon first determination that the associated flag value is not set.

Advantageously, the single packet routing table and routing method of the invention promotes hierarchy independence so that packets may be routed between autonomous and external networks.

BRIEF DESCRIPTION OF THE DRAWINGS

Further features, aspects and advantages of the apparatus and methods of the present invention will become better understood with regard to the following description, appended claims, and accompanying drawings where:

FIG. 1 illustrates example router BGP lookup and Next Hop lookup tables according to the prior art.

FIG. 3 is an illustration of an example hierarchy independent router table 100 according to the invention.

FIG. 4 illustrates a flow diagram depicting the algorithm associated with the hierarchy independent routing table of FIG. 3.

DETAILED DESCRIPTION OF THE PREFERRED EMBODIMENT

Figure 2:
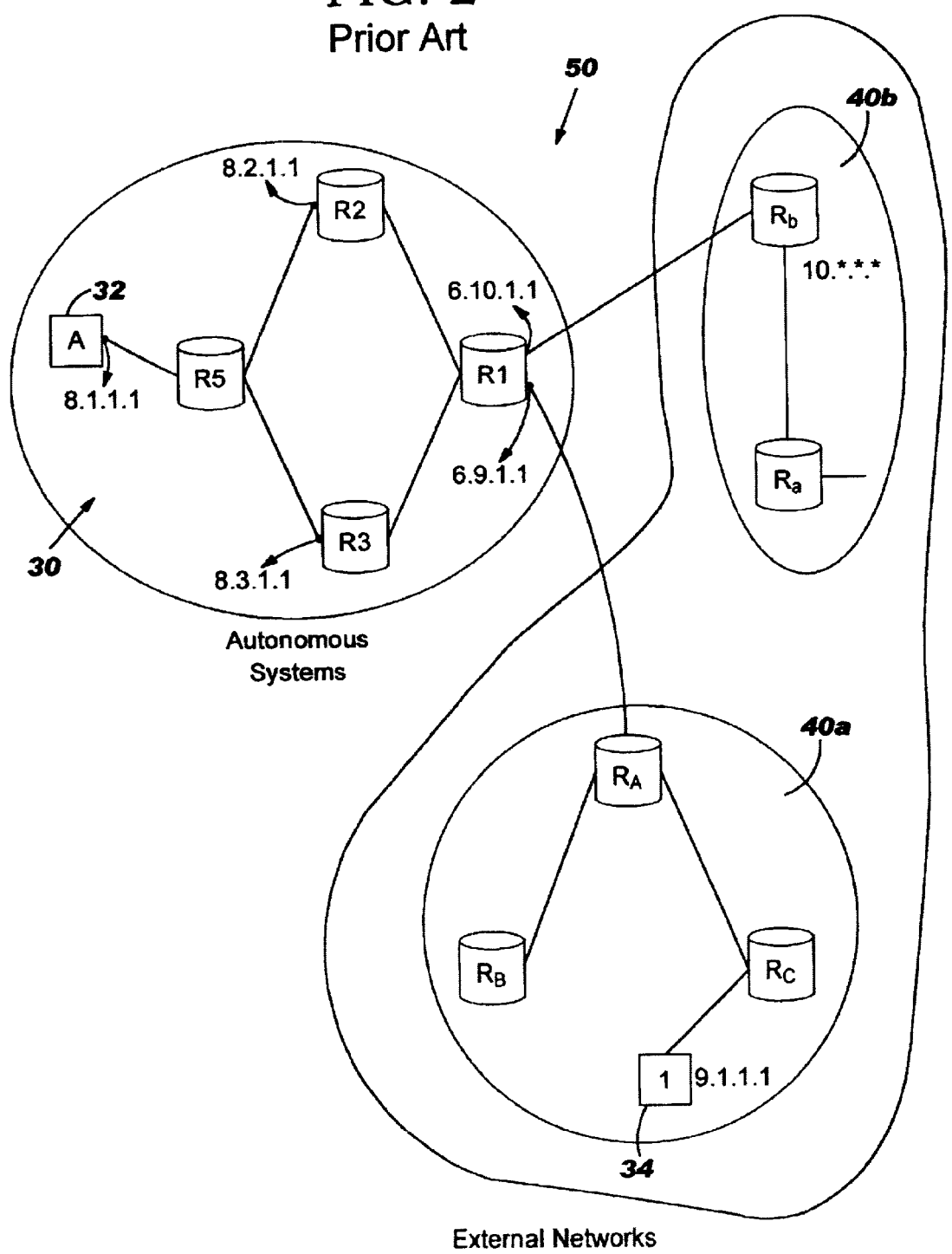
FIG. 2 illustrates an example network configuration comprising an autonomous and external networks including routers and interconnecting paths.

The present invention is directed to a single packet forwarding table in a network processor-based device (e.g., router, switch, etc). Referred to herein as a "hierarchy independent" router table, this table obviates the need for provisioning separate BGP routing and IP next hop forwarding tables, thus, resulting in the reduction of packet routing algorithm complexity. Preferably, the present invention is implemented in a network processor-based device and system such as described in commonly-owned, co-pending U.S. Pat. application Ser. No. 09/384,691 filed Aug. 27, 1999 and entitled "NETWORK PROCESSOR PROCESSING COMPLEX AND METHODS", the whole contents and disclosure of which is incorporated by reference as if fully set forth herein.

FIG. 3 illustrates an example hierarchy independent router table 100 according to the invention. The hierarchy independent table 100 is constructed of a first column 102 comprising subnet addresses 103, a column 108 comprising next hop addresses 109 corresponding with the subnet address, and, a column 112 comprising lookup flags 113. As will be explained, each subnet address value 103 is cross-referenced with the IP packet destination address DA. A match existing between the destination address and the subnet address indicates that the DA is known to the network. The next hop address value 109 indicates to routers where to send the IP packet next (packets "hop" from router to router until they reach IP DA in the shortest path). Preferably, the lookup flag 113 is a true/false value for indicating if the next hop router is an exit router next hop, i.e., a BGP next hop. As will be described in further detail hereinbelow, the lookup flag 113 enables the provisioning of the single routing table that combines the exit router table (i.e., BGP) and IP packet forwarding table. It also facilitates the identification of non-adjacent next hops.

FIG. 4 is a flow diagram illustrating the algorithm 200 implemented by the network processing device for processing the data in the hierarchy independent routing table 100 (FIG. 3). While the following description refers to the IP network protocol, it is understood that the table and method of the invention is applicable to any (ISO) layer three (3) networking protocol, e.g., IPx, CLNP, etc.

As depicted in FIG. 4, a first step comprises a conventional step of parsing the incoming IP packet header and identifying the IP Destination Address (DA). Then, at step 205, a determination is made as to whether the IP DA is valid, i.e., is recognized in the network. If, at step 205, it is determined that the IP DA is not valid, i.e., does not exist, an optional error handling procedure may be performed as indicated at step 208. If it is determined that the IP DA is valid, a table look-up is performed at step 211 for cross-referencing the IP subnet DA of the packet to be forwarded with the hierarchy independent routing table 100 entries. As a result of table lookup step 211 for the DA subnet 103, the corresponding IP address 109 of the router interface servicing the recognized destination subnet 103 (i.e., Next Hop) and, the lookup flag 113 value associated with the recognized destination address are returned at step 215. Then, at step 220, a determination is made as to whether the returned lookup flag value is set, e.g., has a TRUE value. If at step 220, it is determined that the lookup flag is not set, then this indicates that the next hop is not an exit router next hop, i.e., is directly attached, and the packet is forwarded to the next hop as indicated at step 223. If, at step 220 it is determined that the lookup flag is set, i.e., the next hop is an exit router interface that may not be directly attached, then a further table lookup is performed to lookup the real next hop as indicated at step 226 using the IP interface address as an index into the table 100. The process returns to step 220 to determine if the corresponding lookup flag is set for that next hop entry, and the process repeats until the packet is forwarded at step 223.

Applying the hierarchy independent routing table methodology 200 of FIG. 4 to the example provided with respect to the example network of FIG. 2, it is the case that when the System 1 (34) (DA 9.1.1.1) is moved to router RB instead of RC (e.g., at a new address 9.2.2.1, for example), not all router forwarding tables would require updating since each table incorporates exit router next hop lookup flags. Only the routing tables within the network that changed would require updating.

Figures 5A, 5B:
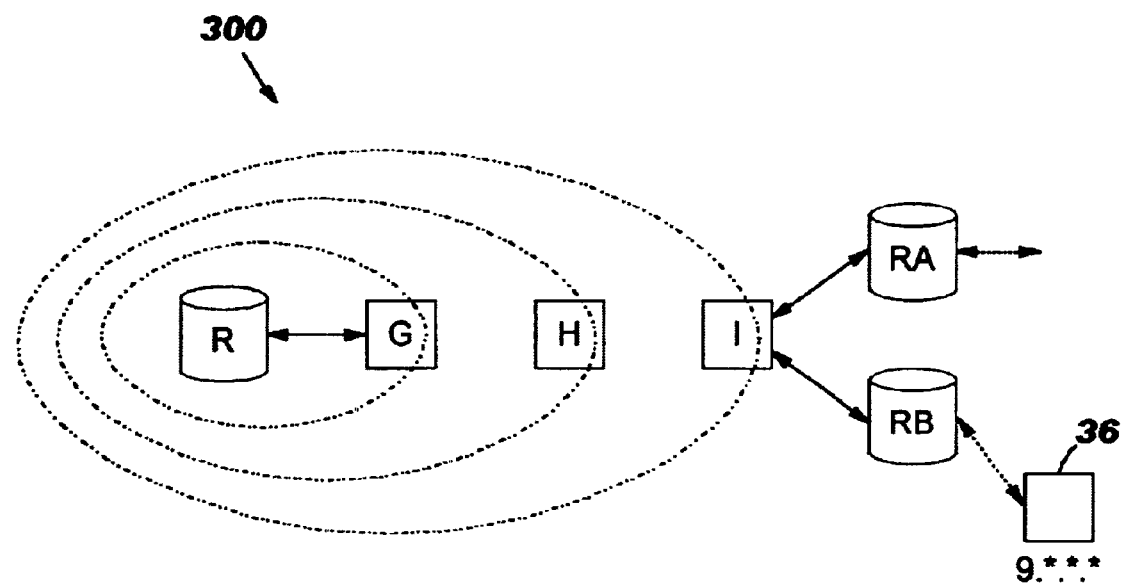
FIGS. 5(a) and 5(b) illustrate the hierarchy independence afforded by the hierarchy independent router table 100 according to the invention.

FIGS. 5(a) and 5(b) depict an example of how the hierarchy independent routing table 100 of the invention promotes hierarchy independence. As shown in FIG. 5(a), a networked environment 300 includes several exit routers G, H, I, (BGP routers) in the fastest path between the IP SA and the DA represented as 36. As shown in FIG. 5(a), for example, the masked subnet address (9.*.*.*) is included within the network connected to exit router I. The algorithm 200 of FIG. 4 enables identification of the next hop addresses in the hierarchy independent routing table 350 depicted in FIG. 5(b). The hierarchy independent routing table 350 identifies example forwarding table contents for the case when an IP packet is to be sent from router R to DA 36 (subnet address 9.*.*.*). Implementing the process 200 provided in FIG. 4, the next hop for subnet 9.*.*.*. would be exit router I as shown in the first table entry of FIG. 5(b). Since the lookup flag value 313 is set true, another lookup occurs (step 220 of FIG. 4) which results in the identification of another next hop exit router H. Again, the process determines that the corresponding lookup flag 316 is set true, resulting in another lookup for the corresponding next hop address of exit router H. This time, the router G is identified as the next hop. However, as the corresponding lookup flag is not set (i.e., is FALSE), the system determines that the next hop (Router G) is not an exit router. Thus, the packet is forwarded from router R to router G as depicted in FIG. 5(a).

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A method for routing packets in a network comprising one or more router devices, said method comprising the steps of:

(a) determining a destination address for a packet to be forwarded;

(b) performing a look-up in a single packet forwarding table in a router device to ascertain packet forwarding information associated with the destination address, said packet forwarding information including a layer three network protocol address of a router interface servicing said subnet address, and an associated flag indicating whether said interface is a BGP exit router interface that may or may not be directly attached to said routing device;

(c) forwarding said packet to said indicated layer three protocol address when said flag value is not set and, if said flag value is set, the steps of:

(d) utilizing said indicated exit next hop layer three network protocol address as an index into said forwarding table to perform a look-up in said single packet forwarding table to find a next hop router and associated flag value, and forwarding said packet to said indicated next hop when said flag value is not set, and otherwise repeating step (d) until said associated flag is not set, wherein at such time said packet is routed to said next hop router.

2. The method according to claim 1, wherein step (a) further includes the step of parsing said packet header for determining said destination address.

3. The method according to claim 1, wherein step (a) further includes the optional step of determining whether said destination address is a valid address.

4. The method according to claim 1, wherein said layer three network protocol includes one of IP, IPx, or CLNP.

5. A network processor device for transmitting data packets in a network, each data packet including a packet header with a destination address location for said packet, said network processor device comprising:

a single packet forwarding table for determining packet forwarding information relating to a destination subnet address of a packet to be forwarded, said packet forwarding information including a layer three network protocol address of a router interface servicing the destination subnet address, and an identifier indicating whether said interface is an exit BGP router interface;

mechanism for performing table look-up operation to identify said next hop router associated with said packet, said mechanism initiating transmission of said packet to a next hop router at said layer three network protocol address if said identifier indicates said next hop router is not an exit router and, if said next hop router indicated in said table is an exit router interface, said mechanism further utilizing said indicated layer three network protocol address of a router interface as an index to perform a subsequent table look-up in said single packet forwarding table to find associated next hop routers, and forwarding said packet to said indicated next hop router upon first determination that said indicated router is not an exit router.

6. The network processor device according to claim 5, wherein said network processor device includes a router.

* * * * *